(12) United States Patent
Poulin

(10) Patent No.: US 9,235,332 B2
(45) Date of Patent: Jan. 12, 2016

(54) INTERFACES FOR PREDICTIVE MODELS

(71) Applicant: Christian D. Poulin, Dover, NH (US)

(72) Inventor: Christian D. Poulin, Dover, NH (US)

( * ) Notice: Subject to any disclaimer, the term of this patent is extended or adjusted under 35 U.S.C. 154(b) by 240 days.

(21) Appl. No.: 13/832,298

(22) Filed: Mar. 15, 2013

(65) Prior Publication Data

US 2014/0245207 A1      Aug. 28, 2014

Related U.S. Application Data

(60) Provisional application No. 61/768,665, filed on Feb. 25, 2013.

(51) Int. Cl.
| | | |
|---|---|---|
| *G06F 3/0484* | (2013.01) | |
| *G06K 9/62* | (2006.01) | |
| *G06N 7/00* | (2006.01) | |
| *G06N 99/00* | (2010.01) | |
| *G05B 13/04* | (2006.01) | |

(52) U.S. Cl.
CPC ............ *G06F 3/0484* (2013.01); *G05B 13/048* (2013.01); *G06K 9/6224* (2013.01); *G06K 9/6229* (2013.01); *G06K 9/6256* (2013.01); *G06K 9/6269* (2013.01); *G06N 7/005* (2013.01); *G06N 99/005* (2013.01)

(58) Field of Classification Search
USPC .......................................................... 706/12
See application file for complete search history.

(56) References Cited

U.S. PATENT DOCUMENTS 6,629,095 B1 *   9/2003   Wagstaff ........... G06F 17/30595
                                                            1/1

* cited by examiner

*Primary Examiner* — Jeffrey A Gaffin
*Assistant Examiner* — Nathan Brown, Jr.
(74) *Attorney, Agent, or Firm* — Fish & Richardson P.C.

(57) ABSTRACT

User interfaces for tools for estimating a probability that a future event will occur based on user input are described. One set of interfaces include rating, trend, cohort record and source controls each of which when selected provide corresponding data from one predictive model that produces predictions of the likelihood of an event occurring in the future based on analysis of data in a database. The system further displays a process of content produced by a model builder that populates the interfaces, and outputs thereof.

21 Claims, 17 Drawing Sheets

INTERFACES FOR PREDICTIVE MODELS

This application claims priority under 35 U.S.C. §119 to U.S. Provisional Patent Application Ser. No. 61/768,665, filed Feb. 25, 2013, and entitled "COLLABORATIVE PREDICTIVE MODEL BUILDING", the entire contents of which are hereby incorporated by reference.

BACKGROUND

This invention relates to data analysis software.

Data is available in many forms, for many topics, and from many sources. The Internet is one example of a data source. The Internet has become an important tool to conduct commerce and gather information. Users, through a web browser, visit internet sites, e.g., web sites by accessing web sites and download web pages, e.g., documents in HTML (hypertext markup language) or equivalent.

SUMMARY

According to an aspect of the invention, a method executed in a computer system for providing a user interface to a tool for estimating a probability that a future event will occur based on user input includes generating by one or more computer systems a first set of interfaces that include rating, trend, cohort, record and source controls each of which when selected provide corresponding data from one predictive model that produces predictions of the likelihood of an event occurring in the future based on analysis of data in a database and sending by the by one or more computer systems the first set of interface outputs to a user system.

According to an additional aspect of the invention, a system for providing a user interface to a tool for estimating a probability that a future event will occur based on user input includes a processor, memory operatively connected to the processor, and a computer storage device storing a computer program product for generating by the processor a first set of interfaces, the computer program product comprising instructions for causing the processor to generate the first set of interfaces, with the first set of interfaces including rating, trend, cohort, record and source controls each of which when selected provide corresponding data from one predictive model that produces predictions of the likelihood of an event occurring in the future based on analysis of data in a database and send the first set of interface outputs to a user system.

According to an additional aspect of the invention, a computer program product tangibly stored on a computer storage device the computer program product for providing a user interface to a tool for estimating a probability that a future event will occur based on user input includes instructions to generate the first set of interfaces, with the first set of interfaces including rating, trend, cohort, record and source controls each of which when selected provide corresponding data from one predictive model that produces predictions of the likelihood of an event occurring in the future based on analysis of data in a database and send the first set of interface outputs to a user system.

The following are some of the features within the scope of the above aspects.

The generated interfaces has a mode control to select between a first basic modes and a second enhanced mode, with the basic mode, users are presented with an overall statistical rating, with supporting statistics, as well as analyst notes, and with the enhanced mode users further are able to build models. The generated interfaces include an initial, search interface comprising a search bar that renders found published predictive models meeting search criteria. With the generated interfaces users can select according to model type or by model topic. The generated interfaces include a region to render search result for a model, with a determined prediction. The generated interfaces include a region to render search results for model, with determined predictions with for each result returned for a found model controls are also returned corresponding to the rating control, the trend control, the by cohort control, the record control, and the source control. The rating control launches the software to determine a prediction of risk on a given day or time. The trend control produces a chart of predictions for the security vs. the actual security values. The "by cohort" control provides a comparison, e.g., between a basket of securities. The record icon provides an area for analyst annotated notes on the model and the source icon provides content from a source. The results area for a particular model further includes a signal strength value wherein tested accuracy of the model is displayed.

According to an additional aspect of the invention, a method executed in a computer system for providing a user interface to model for estimating a probability that a future event will occur based on user input includes generating by one or more computer systems a first set of interfaces that include data source, model, test case and prediction tabs each of which when selected provide corresponding data from one predictive model that produces predictions of the likelihood of an event occurring in the future based on analysis of data in a database and sending by the by one or more computer systems the first set of interfaces to a user system.

This aspect can also be computer program and apparatus embodiments. The following are some of the features within the scope of the above aspects.

The aspects when the models tab is selected the tab allows the user to create a model or sort models by date, and filter models according to privileges, e.g., private, public or all. The aspects when the data sources tab is selected an overlay window is provided to aid the user in selecting data sources from which to collect data that will be used in building the model. The aspects when the test cases tab is selected the interface presents the user an overlay window with fields to select a model name an option description and a sharing level, e.g., private or public and a control to apply a test case to test the selected model. The aspects when the predictions tab is selected predictions are rendered from execution of the model and a sort control that sorts predictions according to date and/or by model performance.

Described are processes including methods, computer program products and apparatus to provide interfaces to models that permit easy user interaction and offers users options of how to use the models. One set of the interfaces are for model use/search and the other set of interfaces are for model building. From the model use set easy accessible controls are provided to enable various functions including rating, trend, cohort record and source controls.

Details of one or more embodiments of the invention are set forth in the accompanying drawings and the description below. Other features, objects, and advantages of the invention will be apparent from the description and drawings, and from the claims.

DETAILED DESCRIPTION

Figure 1:
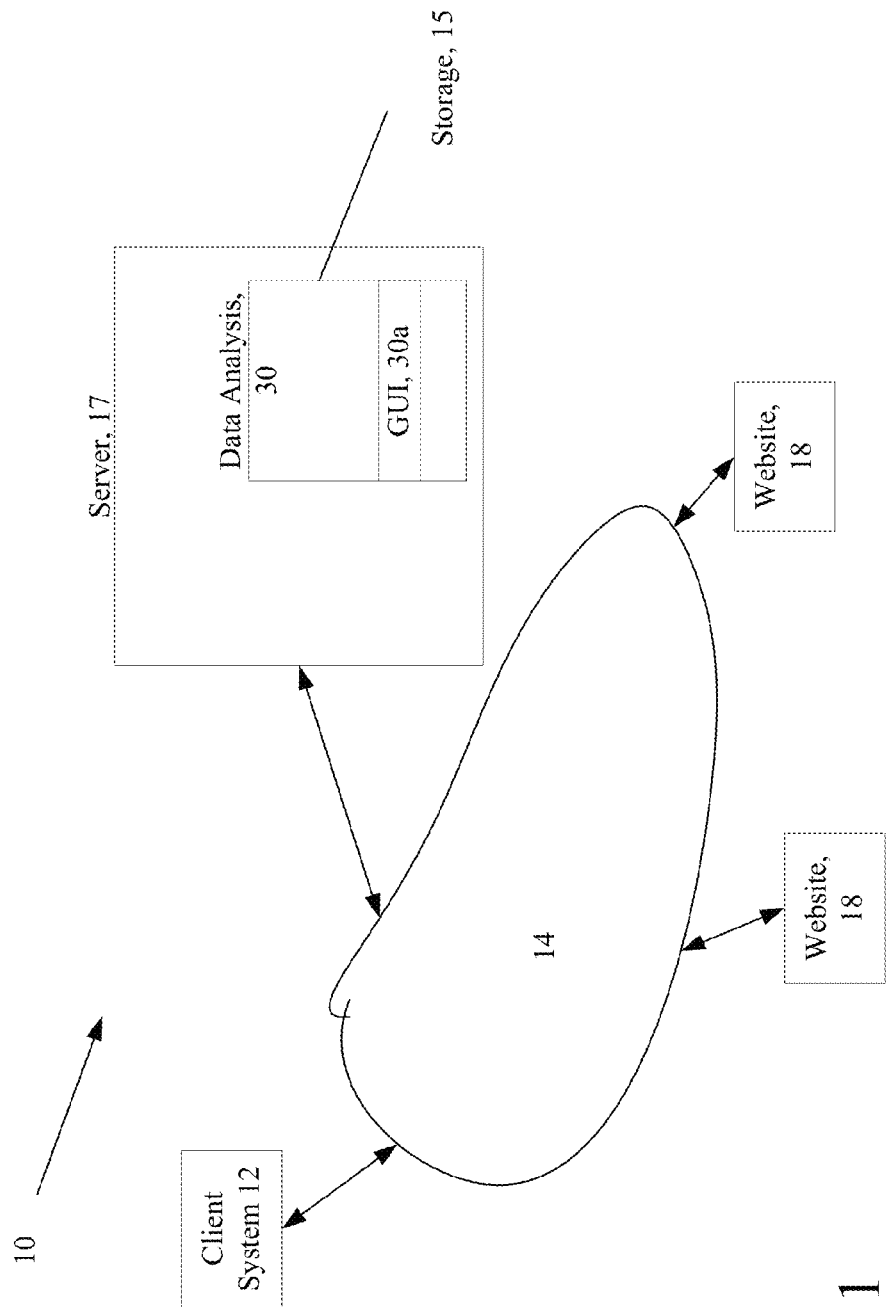
FIG. 1 is a block diagram of system employing data analysis software.

Referring to FIG. 1, a networked computer system 10 includes one or more client systems 12 (one illustrated) connected to one or more server systems 17 (one illustrated) through a first network 14, e.g., the Internet. The client system 12 runs a browser program (not illustrated) that requests the server computer 17 to invoke data analysis software 30. Although the data analysis software 30 is shown in FIG. 1 residing on a server 17 that can be operated by an intermediary service, it could be implemented as a server process on a client system 12 or as a server process on a corporate or organization-based server. The data analysis software 30 resides on a computer readable storage medium 15 e.g., optical, solid state or magnetic disk or in memory, e.g., semiconductor memory for execution. The data analysis software 30 analyzes data from any data source typically obtained by accessing one or more websites, 18. As one example, the data analysis software 30 analysis data obtained from, e.g., the Internet by accessing site(s), e.g., web sites 18a-18d that are on web servers (not shown) through a universal resource locator (URL). A URL allows access to information that may be on sites 18a-18d, e.g., web sites (HTTP), FTP sites, NEWS groups, etc.

The data analysis software 30 can analyze data accessible through various protocols including HTTP, FTP mentioned above and other protocols such as proprietary protocols, e.g., for a database by modifying the URL location to contain a key word or other indicia for the proprietary protocol. Other networks and data sources could be used. For instance, the data analysis software 30 can operate on data from a proprietary data feed, a private network and so forth.

On the server 17 the data analysis software 30 includes analysis objects 20 that are persistent objects, i.e., stored on a computer hard drive 15 of the server in a database (not shown). At invocation of the data analysis software 30, the analysis objects 20 are instantiated, i.e., initialized with parameters and placed into main memory (not shown) of the server 17, where they are executed through the data analysis software 30.

As described below, the output from the data analysis software 30 is a result object 50 in the form of a prediction table that can be output as an HTML or equivalent web page. The result object 50 will include information as to a database or text representation of relationships between parent and child data. Formats for the data can be ".net" files (industry standard file format for a Bayesian network file). Alternatively, other formats can be used such as a standard text file and so forth.

Figure 2:
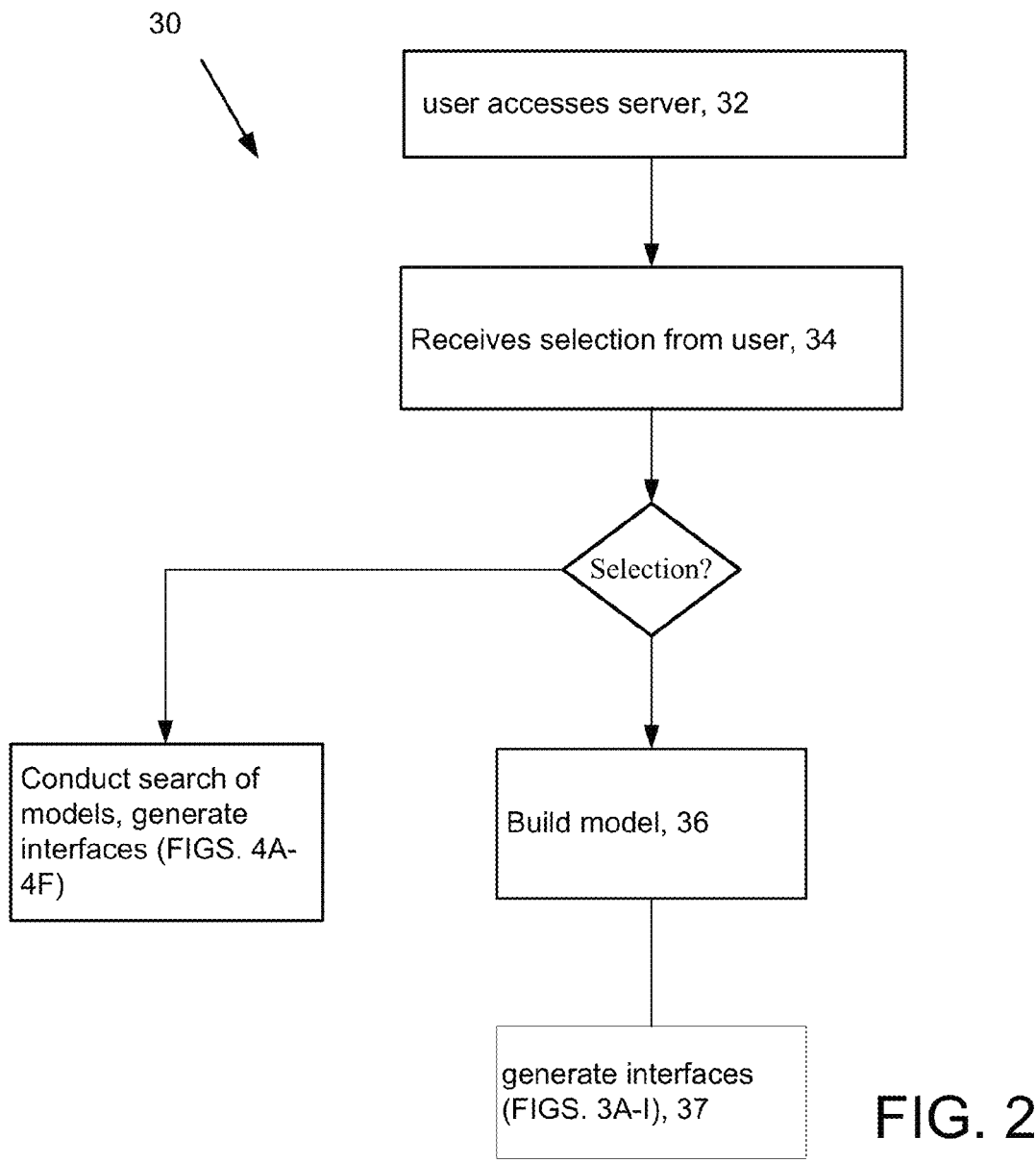
FIG. 2 is a flow chart depicting a model building process.

Referring now to FIG. 2 the server 17 can be used to access and/or build models and presents different interfaces according to the particular behaviors. (An example of a process for building prediction models and searching for prediction models is described in U.S. Pat. No. 8,160,977 incorporated herein by reference in its entirety.) A user accesses 32 the server 17 and the server receives 34 a selection or message from the user. If the selection is to build a model, the server executes a build model process 36 generating 37 interfaces (FIGS. 3A-3I). If the selection is to conduct a search the server conducts a search and generates 38 interfaces (FIGS. 4A-4E).

One example of a statistical engine is a Bayesian Statistical engine to define correlative relationships. Others could be used such as a genetic algorithm as discussed below or other type of statistical classifier language. A statistical engine defines correlative relationships between child and parent variables. Other more complex relationships can be defined such as child to child relationships. The engine processes the dataset to produce child and parent variables that are defined by applying the engine to the dataset to establish relationships between the child and parent variables, as discussed in the above incorporated by reference patent.

A typical model building process is performed in conjunction with a database (not shown) that stores models generated by the model building process. The database has searchable content comprised of predictions of future behavior. The model building process allows for a user to "select data", "select data parameters", "select a model builder", "select access permissions", and "test the models." The model building process 36 is implemented in conjunction with the graphical user interfaces mentioned below.

Model building is a CPU intensive stage of processing for the production of models of the data. A machine learning approach can alternatively be used, e.g., by using a genetic programming classifier that searches through a very large set of representations, and determines those representations that most accurately fit training data. One such genetic programming classifier (94, FIG. 3B) can be based on Meta-Optimizing Semantic Evolutionary Search (MOSES). The algorithm implemented by MOSES is discussed in several references See for example Moshe Looks. Competent Program Evolution, Doctor of Science, thesis Washington University, St. Louis, USA, 2006 incorporated herein by reference.

Model building starts by producing a program tree (in the current usage, a tree of Boolean operators). The nodes and leaves of the tree are free to vary over the full range of input variables, as well as to vary over the Boolean operators (and, or, not). For any fixed choice of nodes and leaves, the resulting tree may be scored against the input training data (the features) to see how well it fits; clearly some choices will be better than others. The set of all possible node and leaf settings are explored using a genetic evolutionary search algorithm combining hill-climbing and genetic cross-over. When no further improvements are found, the process is begun again, this time with a different, and usually, a more complex program tree. This step is again repeated until either a perfect score is reached, or set time-limits are exceeded.

The result of this process is a large number of representations, each of which model the training data more or less equally well. The ensemble of these representations is then referred to as the model. This model is effectively a distilled, compressed version of the training data.

The model classifies the training data. Given the form of the model, it may be used classify that is, to make predictions about the value of the dependent variable (prediction) based on new and different input variables (e.g., word counts). Classification is done by presenting the same inputs to each of the representations, with each representation making a prediction: a majority vote is then taken to determine the final classification.

The theoretical validity of using the model for classification in this way is founded on the belief that the model captures something essential about the way that words are used in text. This is a reasonable belief, given industry experience with statistical classifiers. The practical validity of the model can be tested in several ways; k-means cross-validation. The input dataset is split into k subsets, with each subset containing 1/k of the dataset. Training is then performed using k−1 of these subsets as input, and a model is built (that is, a model is built on k−1/k' of the data). The accuracy of the model is evaluated on the subset that is held out (on the remaining 1/kth). This process is repeated k times, to obtain k models, and k different accuracy test results. The test results are then averaged together to obtain an estimate to the overall system accuracy.

Figure 3A:
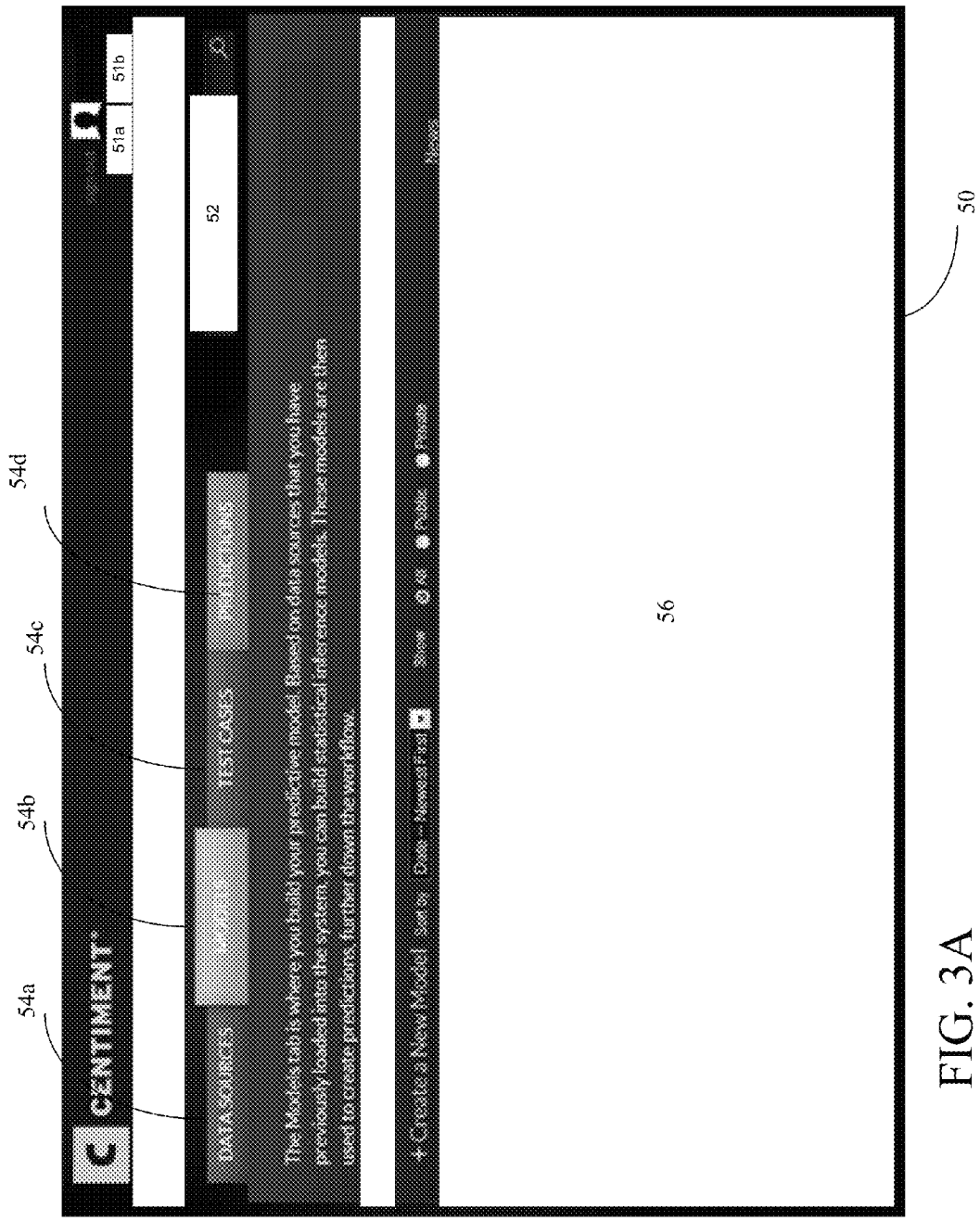
FIGS. 3A-3G are a series of diagrams depicting interfaces.

Referring to FIG. 3A, initially a user is presented with an interface 50 to select either a search or a create process. This environment lets a user build custom predictive models. Selecting Models tab, and selecting+Create a New Model, prompts for a variety of options to build the model. The interface 50 includes controls 51a, 51b that select the version of the application to execute, e.g., a premium version 51a or a standard version 51b. In one embodiment, the premium version enables model building, model searching and execution, whereas the standard version only enables model searching and execution. The interface 50 includes a search bar 52. The interface 50 is a tabbed interface including a data sources tab 54a a models tab 54b, a test cases tab 54c, and a predictions tab 54d. In FIG. 3A the models tab is selected and allows the user to create a model 58 or sort models by date, and can filter models according to privileges, e.g., private, public or all. The server prompts the user to select a categorization for the model to allow easier classification and categorization within the system. The model building process includes a data collection process.

Figure 3B:
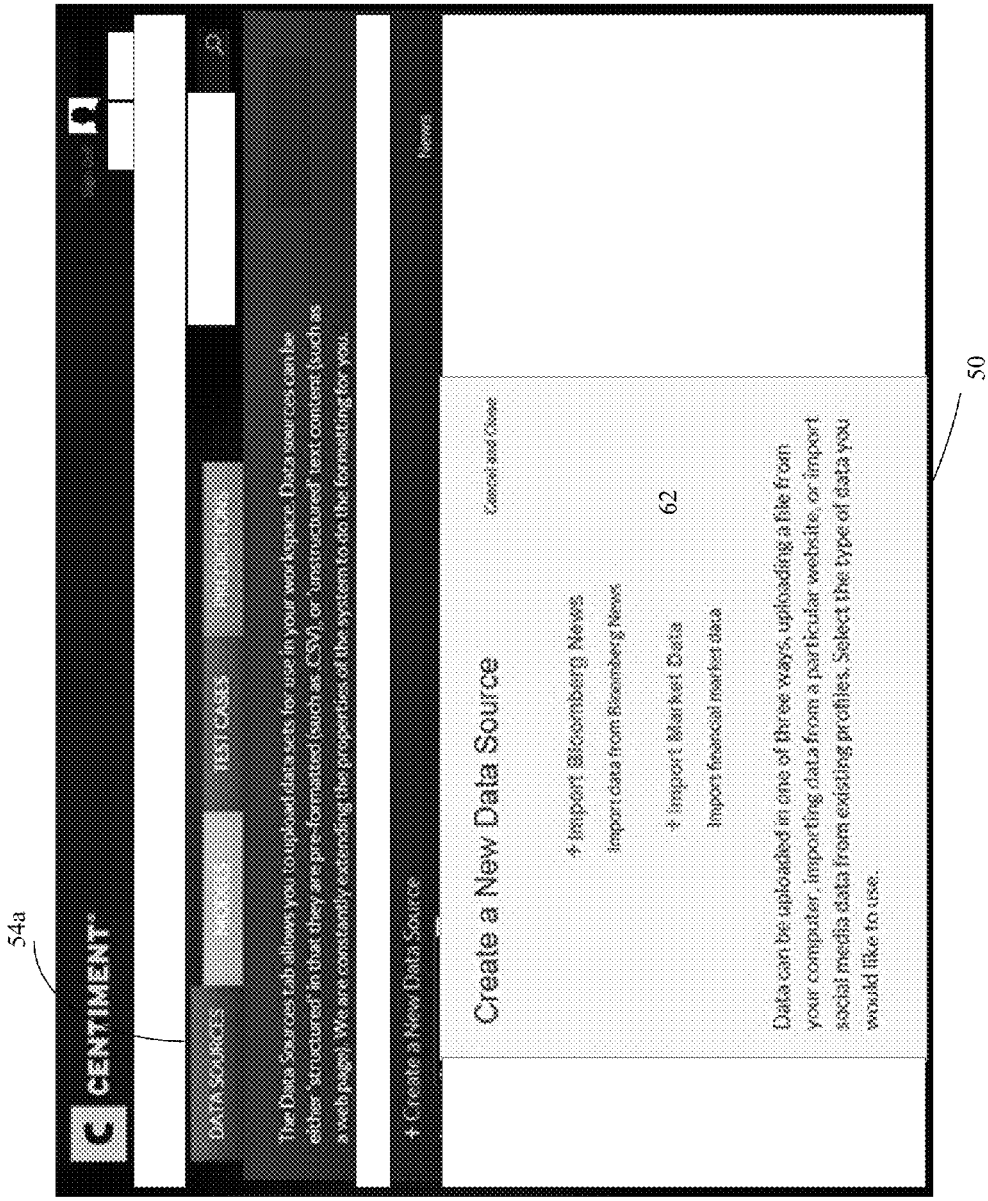

Referring now to FIG. 3B, the graphical user interface 50 has the data sources tab 54a selected and an overlay 62 window is provided to aid the user in selecting data sources from which to collect data that will be used in building the model. Data sources can be any type of source (news) or market data. FIG. 3B provides new data sources for the application and is accessed from the data source tab 54a. By selecting Data Sources tab 54a, and create a new data source, user is prompted to upload data into the system from a particular data source. The example above shows the option to upload news data from a data provider (e.g., Bloomberg) along with financial market data from another data provider.

Figure 3C:
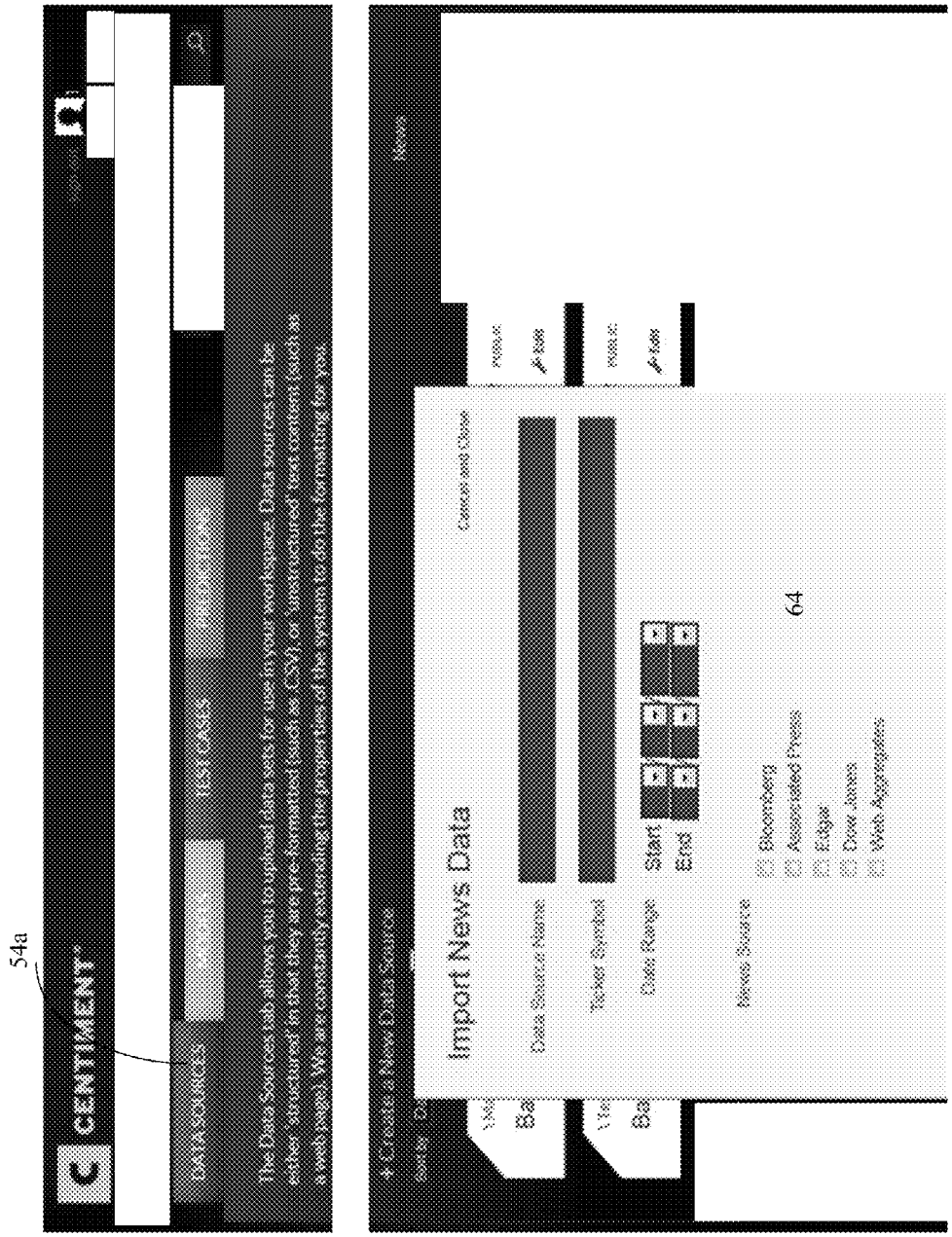

Referring now to FIG. 3C, the graphical user interface 50 has the data sources tab 54a selected and an overlay 64 window and in particular are one or more web data sources or other remotely available data sources. Using the graphical user interface 50 the user selects an import source either from a listing, or a name, e.g., URL or a ticker symbol (others could be used) to import news data. Data can be imported according to a data range. Alternatively, data can be uploaded from a file on a client device, or imported social media data from existing profiles.

Figure 3D:
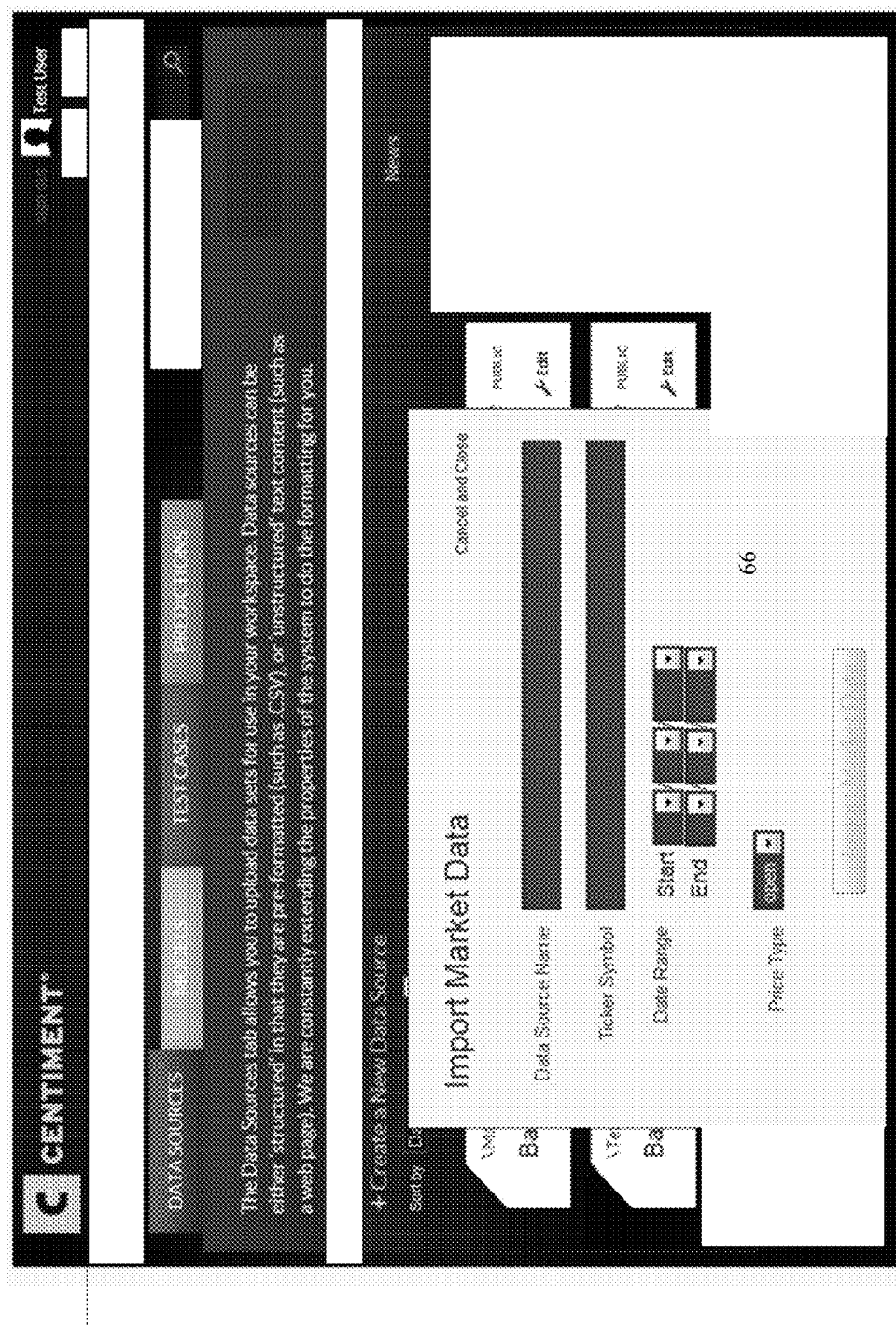

Referring now to FIG. 3D, the graphical user interface 50 has the data sources tab 54a selected and an overlay 66 window is provided to aid the user in selecting financial data sources from which to collect data that will be used in building the model. Data sources for price data on a financial instrument, such as security can be any source as by specifying the source name. Using the graphical user interface 50 the user selects an import source and enters a ticker symbol (others could be used). Data can be imported according to a data range. A price type is also provided.

Figure 3E:
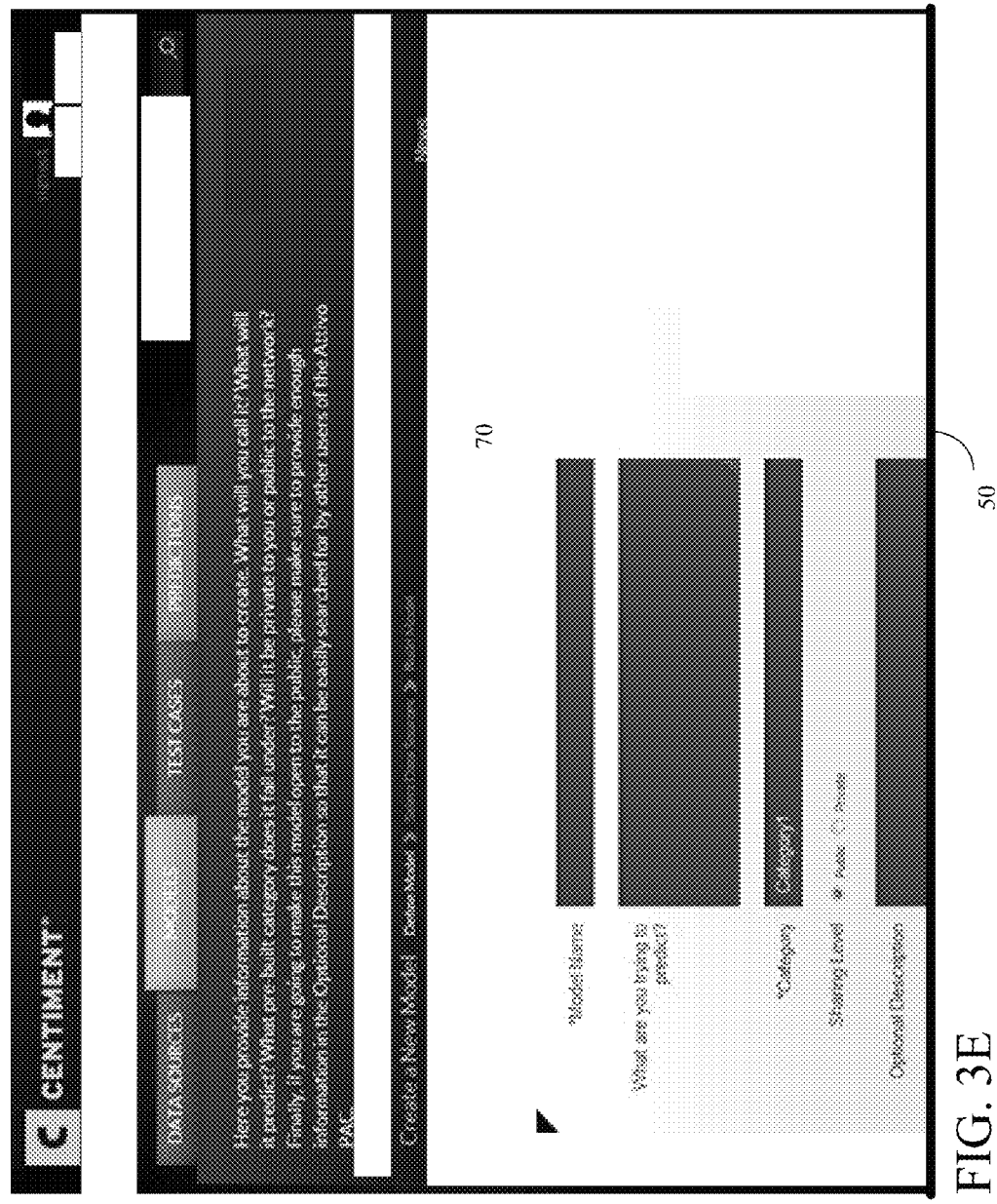

Referring to FIG. 3E, the model tab is selected and the interface 50 presents the user an overlay window 70 with fields for a model name, what the user wants the model to predict, a category and an option description. The interface also specifies the sharing level, e.g., private or public.

Figure 3F:
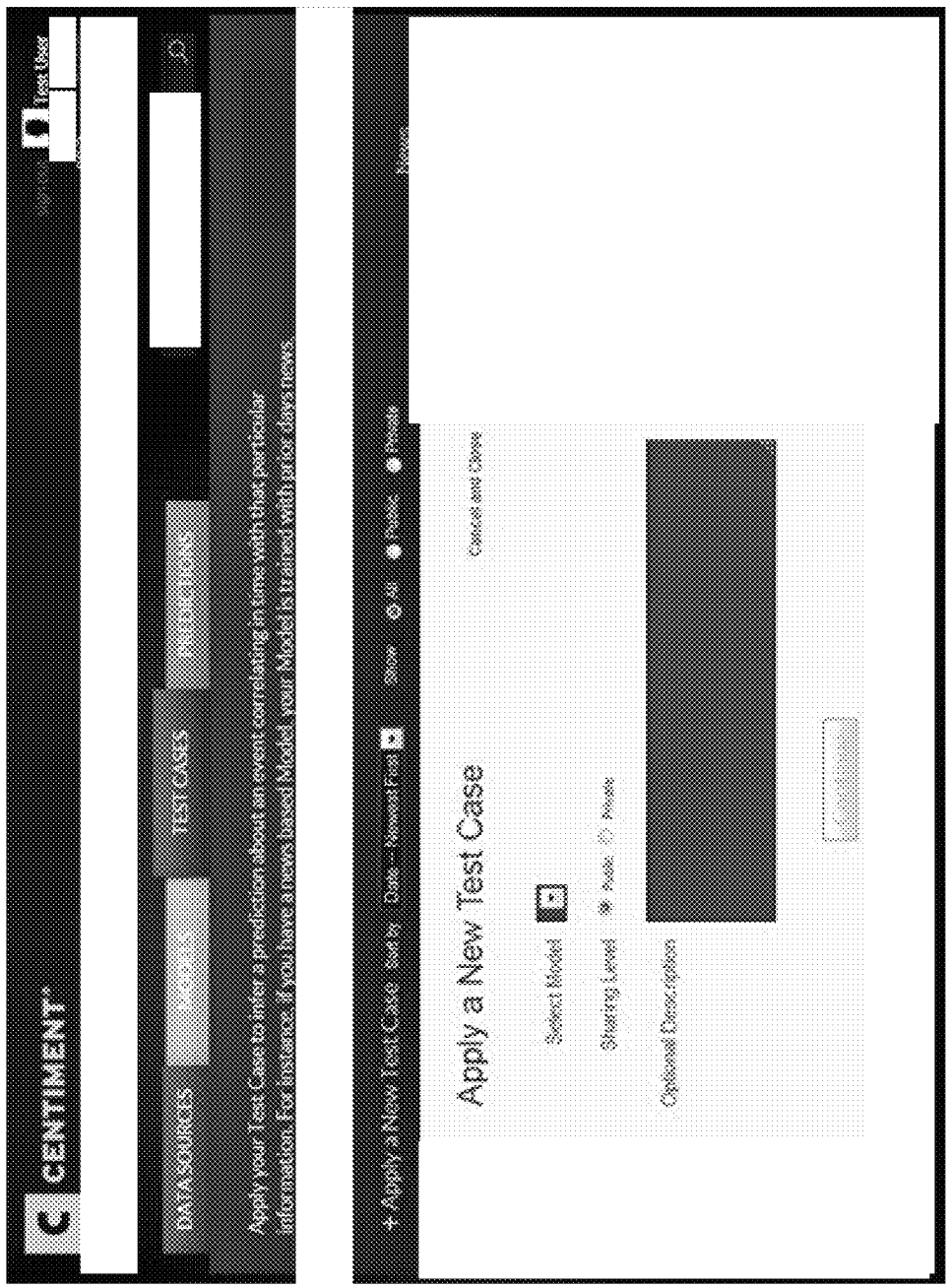

Referring to FIG. 3F, the test cases tab is selected and the interface 50 presents the user an overlay window 72 with fields to select a model name an option description and a sharing level, e.g., private or public. The overlay also includes an optional description field. In this interface the user applies a new test case to test the selected model. The result of this test case tool is what populates the predictions tab.

Figure 3G:
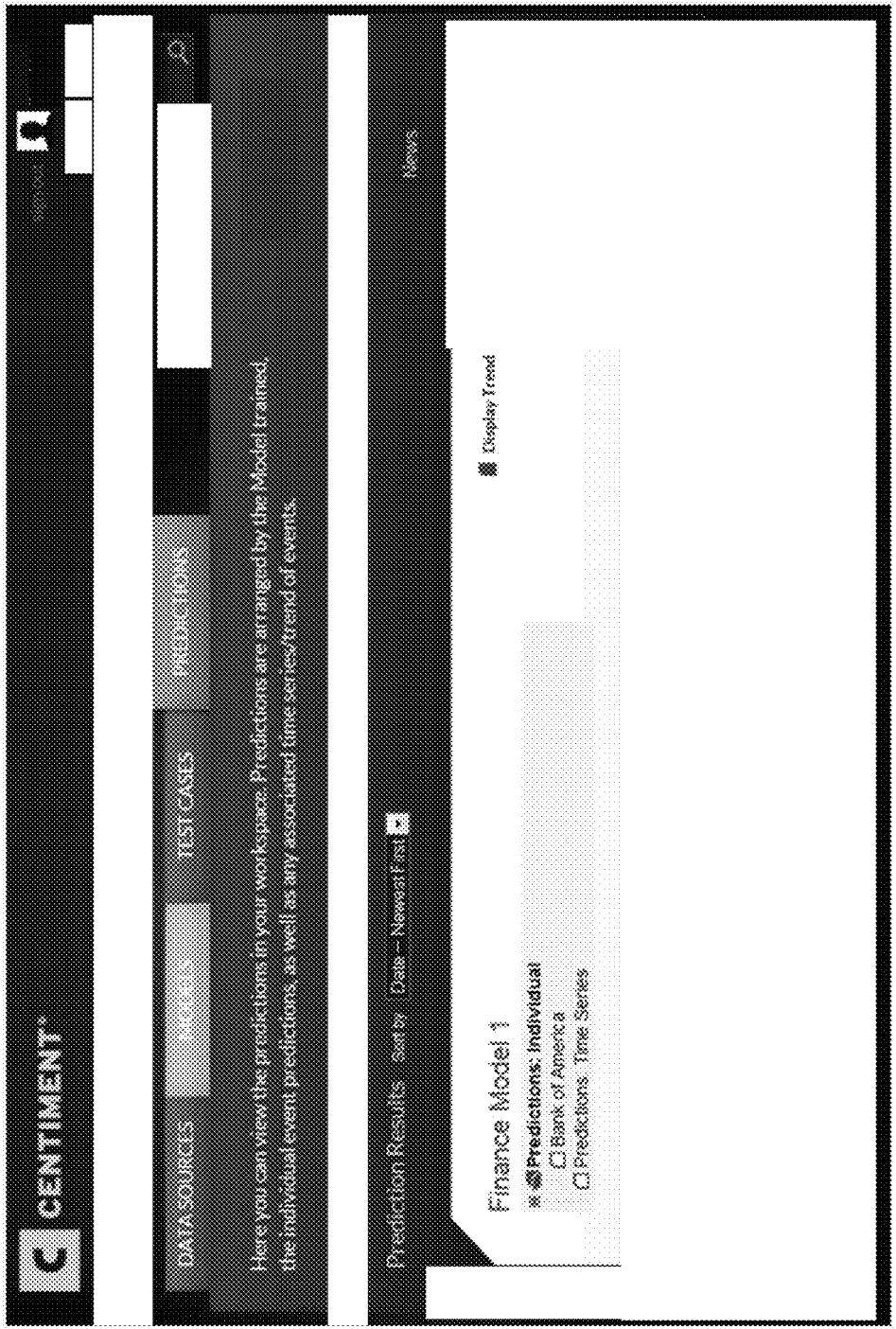

Referring to FIG. 3G the predictions tab is selected as shown, with a sort control of prediction results. The sort control can sort predictions according to date and by model performance. Also shown is a prediction result in a folder "Predictions: Individual" for here Bank of America and shows a type, here "Prediction Time Series."

Interface icons are used to abstract the mathematics of predictive modeling building. These 'Icons' are assumed as graphical representation of a process selectable by a user through a user interface. For instance data will have styled icons denoting their source, and model building functions will have such things as 'build', 'merge', and 'analyze' buttons.

Specific interfaces include a search interface, e.g., a web-search engine bar that displays a search interface for granular-based sentiment searching for securities, where the user navigates various views of the predictive features' effect. For instance, sentiment is now a common description of distilling the tone out of text. Usually this is just 'positive', 'neutral', or 'negative' with either granular sentiment or the quantification of how negative, (e.g., −99) is the sentiment being used. Additionally from log in screens a user could navigate to a basic screen or to a model builder, based on credentials when the system sends a dashboard that allows the user to click on the upper right 'Model Builder' which is labeled as Pro in figures as discussed herein.

The workflow required is to build a 'Data Source', the 'Models' of that data source and apply sample 'Test Cases' to the models to get Predictions.

Search Process

Assuming that the model (along with many other models produced, e.g., by the same or different individuals and stored in the system) have been set for public use, the model are searchable.

Figure 4:
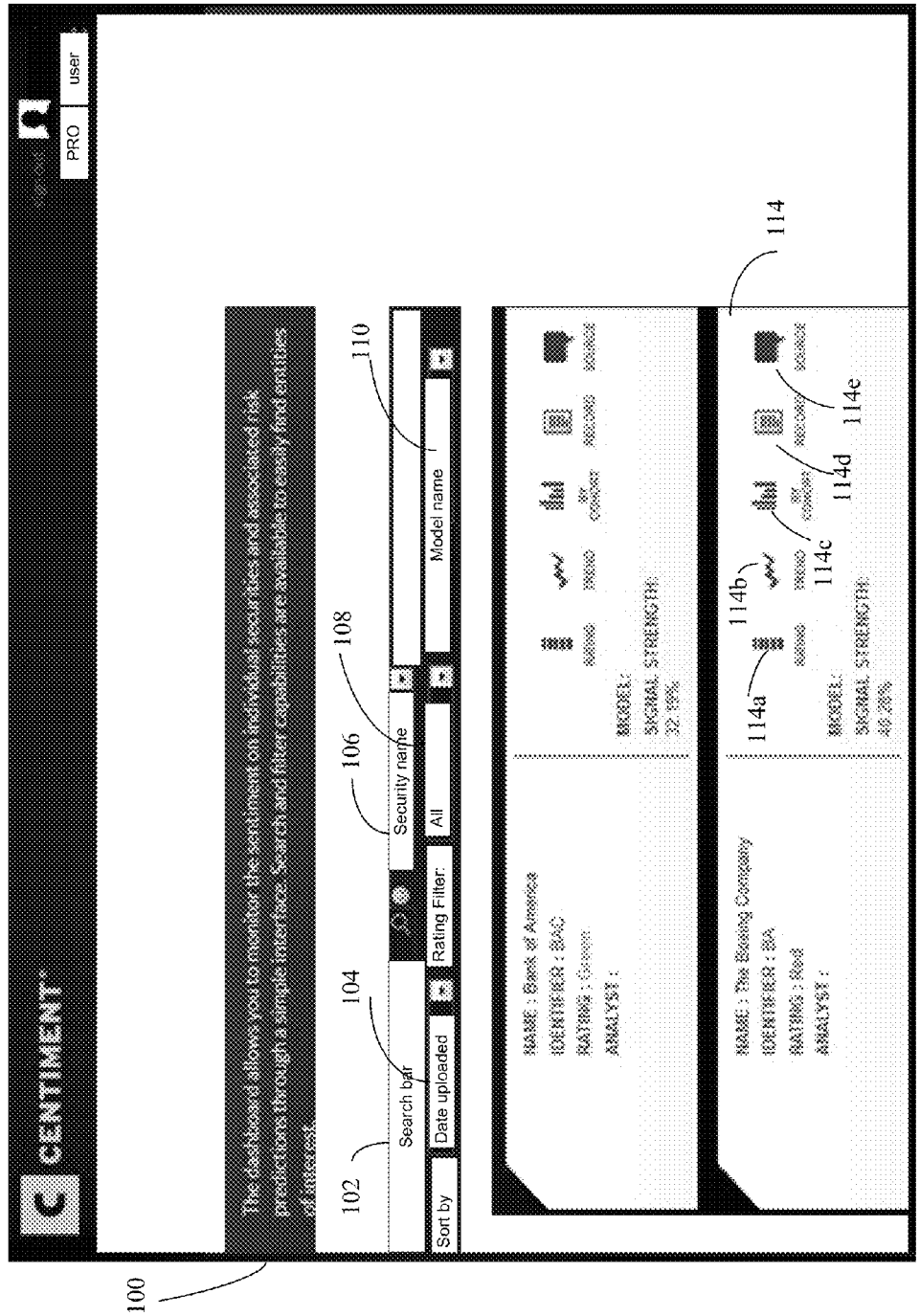
FIG. 4 is a user interface for model searching.

Referring now to FIG. 4, the software interface 100 comes in two modes: 'Basic' and 'Professional'. In the Basic view, users are presented with an overall statistical rating, with supporting statistics, as well as analyst notes. FIG. 4 depicts an illustrative initial, search interface 100 showing found models. In this case, we see Bank of America and The Boeing Company displayed. The search interface 100 is used to access published predictive models. Users can select from many model types. To use the system, users type in search terms in field 102, and the system returns predictive models and resulting probabilities for those models. Users can alternatively select models by topic such as security name field 106 and can search using fields date uploaded 104, rating 108 model name 110. Search results are displayed in region 112.

An exemplary search result 114 is shown for, e.g., Boeing. Displayed is information 115 such as the name of the model "The Boeing Company" and identifier (BA) here the ticker symbol for The Boeing Company a rating (here Red) color coded as a negative prediction and with a synopsis of analyst notes if any associated with the model.

For each result returned for a found model controls are also returned. Thus for the search result 114 are included a rating icon 114a, a trend icon 114b, a by cohort icon 114c, a record icon 114d, and a source icon 114e. The rating icon launches the software to determine a prediction of risk on a given day or time. Rating is the prediction, which in the example is financial risk. The trend icon produces a chart of predictions for the security vs. the actual security values. The "by cohort" icon provides a comparison of a basket of similarly classified securities it the security represented by the model. The record icon provides an area for analyst annotated notes on the model of the security and the source icon provides content from a source. The results area for a particular model and includes additional options such as model, where the name of the particular model that was used to generate the result is display, as well as a signal strength value where the back tested accuracy of the model is displayed.

The results of a search of future probability models provides exemplary results as shown in FIGS. 4A-4E below.

Figure 4A:
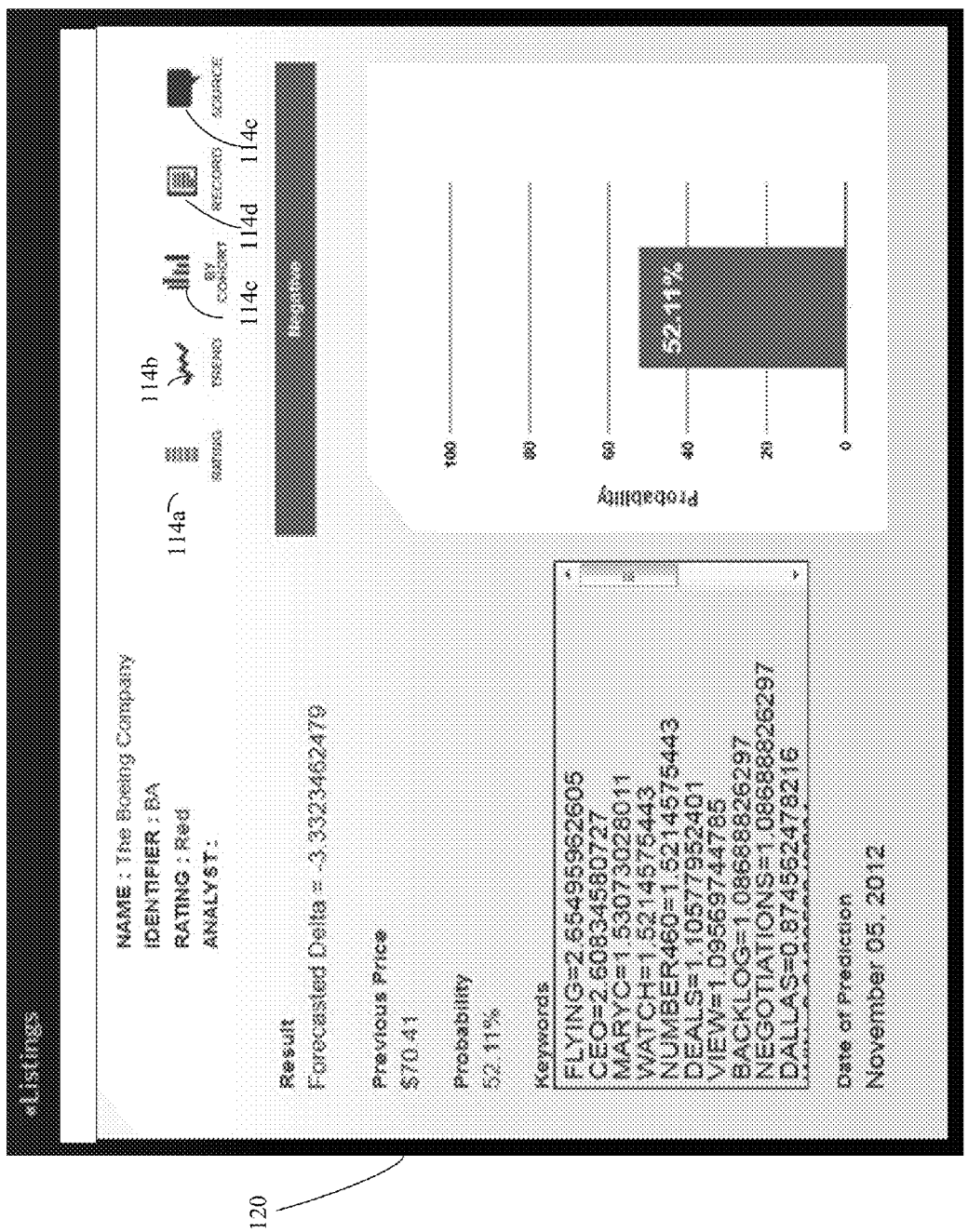
FIGS. 4A-4E are a series of user interfaces for reporting results of execution of predictive models.

Referring now to FIGS. 4A-4E, after the user selects one of the search results in FIG. 4A and selects one of the controls, the software produces the corresponding results.

For FIG. 4A, the search result interface 120 when the rating icon 114a (of icons 114a-114e FIG. 4) is selected is shown for Boeing. Displayed in a screen are results of the prediction that the model forecasts as a "Forecast Delta", which in this case is negative 3.3323 . . . and a corresponding visual graph on the right that indicates 'Negative' and shows a probability or confidence value that is calculated for the model prediction. The forecast delta in this instance is the deviation in price from a current price of the security BA. The screen also shows the Previous Price of BA (here for illustration a made up value for the price of the security. The screen also includes a Probability value, i.e., the probability (statistical confidence) in this particular rating. Also shown in the screen are a listing of the keywords that were particular to this model (again here the examples are made up for purposes of illustration). The screen also displays a date of prediction, e.g., the date that the prediction was produce, not to be confused with a predicted date.

Figure 4B:
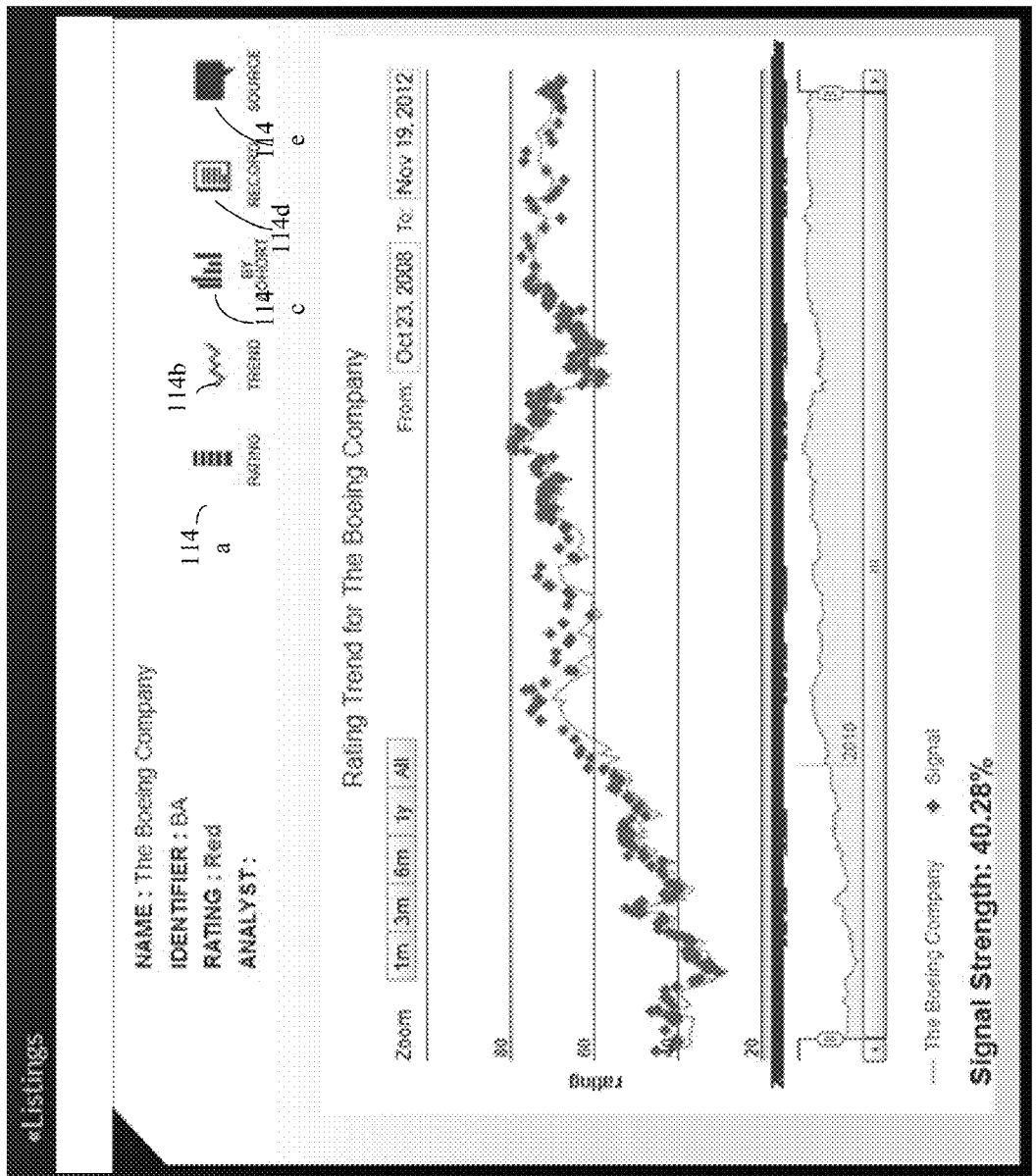

Referring now to FIG. 4B when a user selects the trends icon 114b (of icons 114a-114e FIG. 4), the user is presented with an interface 122 with a collection of predictions for the particular security, e.g., Boeing, so as to look for trends. Much like a physician looks for a heartbeat; the trend icon provides a "behavioral ticker" for the particular security by concatenating together past predictions for that security. We also note that the back test result of the Signal Strength is on display. Selection of a point provides the RATING figure for that specific time stamp allows, e.g., an analyst to drill down on the specific prediction. The interface 122 has a slider bar that allows the user to change the parameters of an Inference/Prediction on any given day (a 24 time increment assumed in the example). While this is a simple graphical presentation of given model, a real result may be more complicated.

The Value of information (VOI) score analysis is performed based on computing mutual information between each predictor variable and the target. VOI calculation is an entropy calculation to measure variable interdependence. The Value of information analysis sorts predictor variables by their predictive power with respect to the target variable. Value of information analysis is, in general, relevant for all types of models, particularly those discussed herein. The underlying assumption in Value of information analysis is that the highest scoring variable deserves the observer's attention first, followed by successfully declining scoring variables.

Figure 4C:
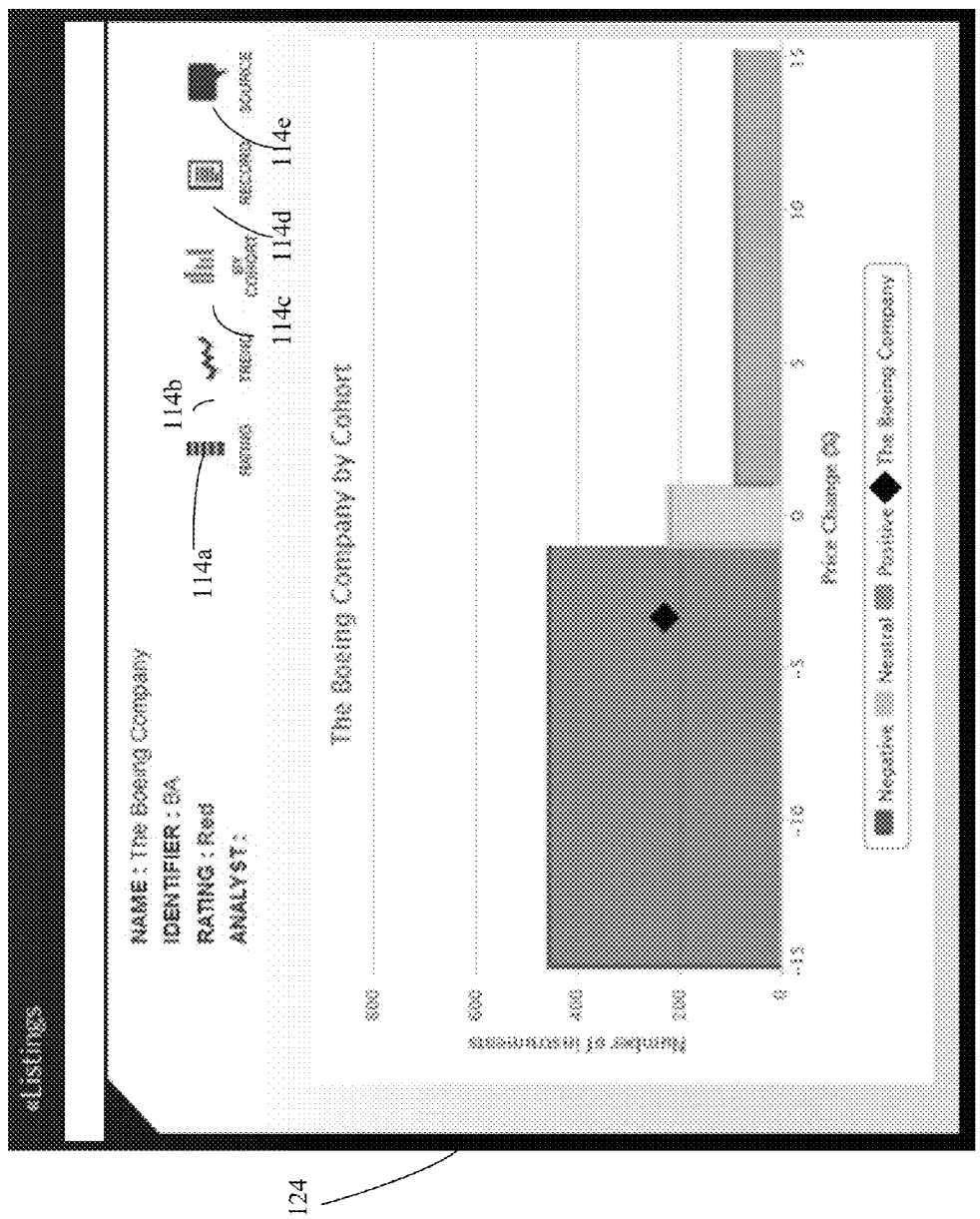

Referring now to FIG. 4C when a user selects the "by cohort" icon 114c (of icons 114a-114e FIG. 4), an interface 124 depicts where Boeing's rating is in relation to other profiles.

Figure 4D:
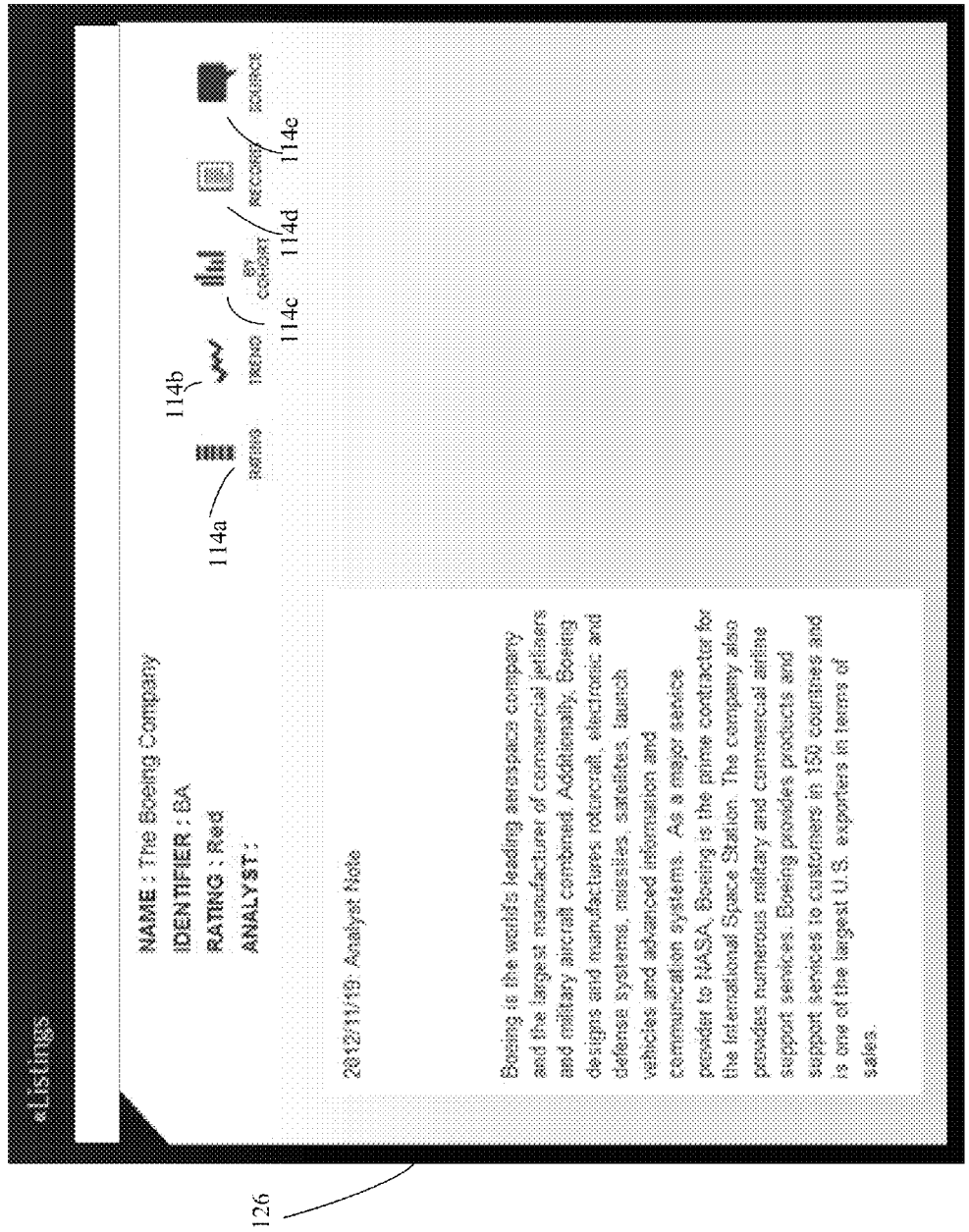

Referring now to FIG. 4D, when a user selects the sources icon 114d (of icons 114a-114e FIG. 4), interface 126 depicts information about Boeing. Analysts can add notes specific to the securities they are observing. The combined analysis of online text, as well as the annotated observations, provides a broader picture of text driven prediction.

Figure 4E:
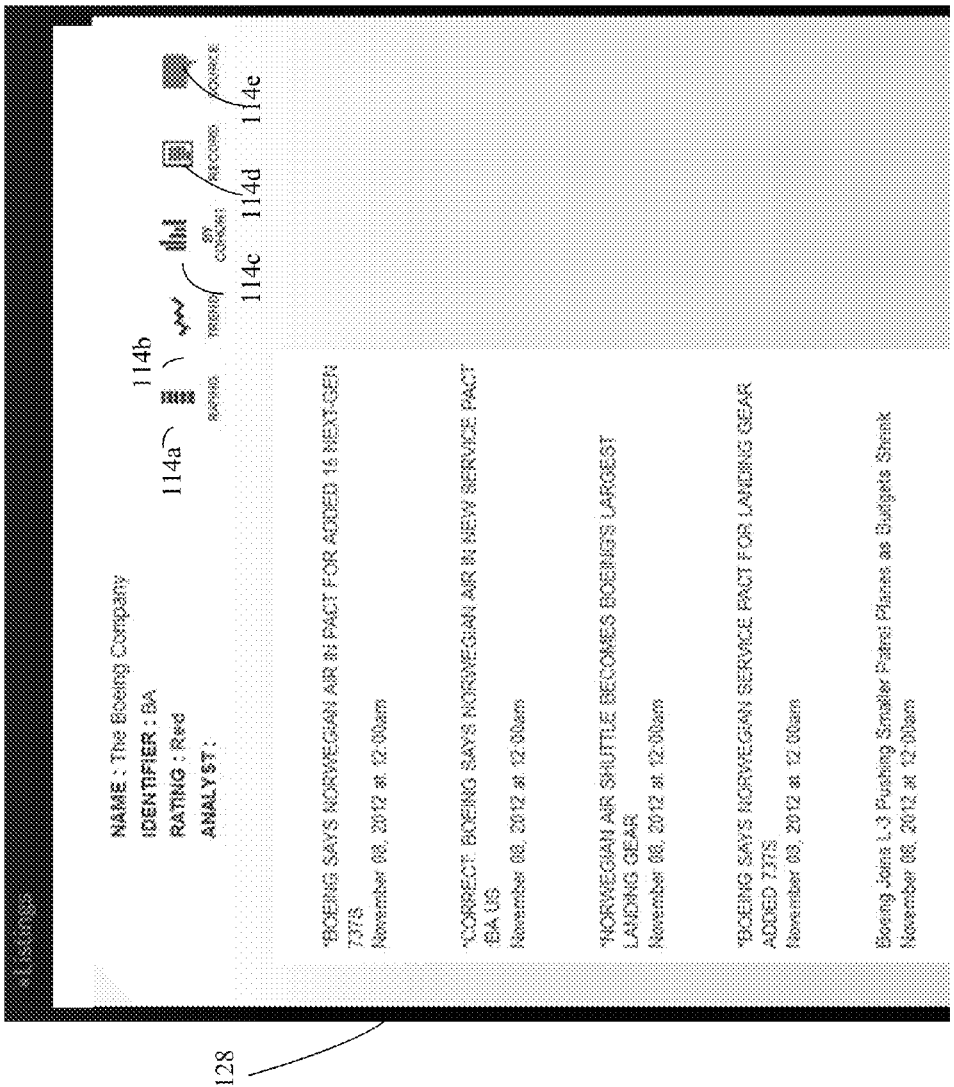

Referring now to FIG. 4E, when a user selects the sources icon 114d (of icons 114a-114e FIG. 4) interface 168 allows drill down to sources. For example, if a risk profile suddenly changes, or if a user desires to drill down on specific wording or phrases, the original content from the various source networks can be viewed.

Exemplary Usages for the Predictive Models

In the area of "health" predictive models and the arrangements described can include a "health risk factors prediction system." In the "health risk factors prediction system," a variety of factors are input into a health model in the system and the relative risk (e.g., as a prediction) for a disease (such as Influenza) is determined. Another predictive model can be based on a "genetic traits prediction system." In the "genetic traits prediction system," a variety of population factors are input into a genetic traits model and the system and the various elements of individual's genome are used to predict risk factors congenital disease associated with the user's genome.

In the area of "finance" predictive models and the arrangements described can include a "securities value prediction system," as generally discussed. In the securities value prediction system a variety of factors are input into the system and various elements of security, e.g., the price of the security or the volume traded or volatility of the security are determined. The securities value prediction system can be extended to a commodity price prediction system. In the securities value prediction system, a variety of factors are input into the system and, e.g., the price of commodity such as FCOJ (Frozen Concentrated Orange Juice) is determined.

In the area of "WISDOM" (e.g., knowledge) predictive models and the arrangements described can include a "movie success/revenue prediction system based on a variety of factors that are input into the system to predict the likely box office success (revenue) of a release of the film. Such a tool would be very useful for movie studios and movie distribution companies.

Other generic predictive models and the arrangements described can include a "music prediction system" where based on a variety of factors inputted into the system various elements of music (lyrics, and score) are determined. Other predictive models and the arrangements described can include a "political behavior prediction" system in which political behaviors are predicted based on a variety of factors inputted into the system. Exemplary behaviors could include topics such as electability, voting records, and poll results.

Other predictive models can include a "media bias prediction system" to predict media bias behaviors based on a variety of factors inputted into the system. The marketplace can be extended to "Games" as mentioned above to foster user interfaces based upon competitions to produce more accurate predictions and user competitions to produce original predictions.

Naive Bayes Model (NBM)

Figure 5:
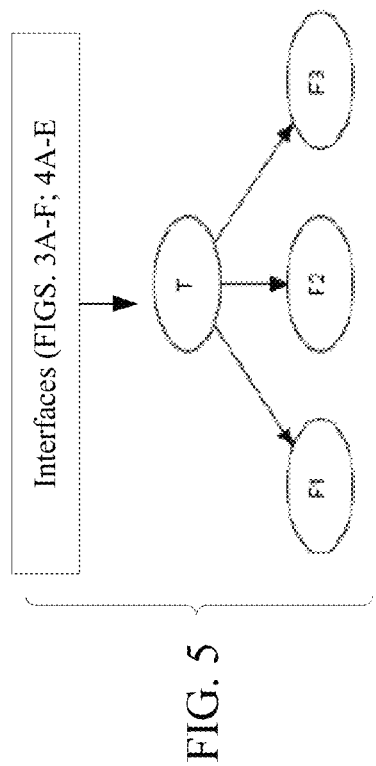
FIG. 5 is a diagram depicting a structure of a Naive Bayes Model (NBM.
Figure 6:
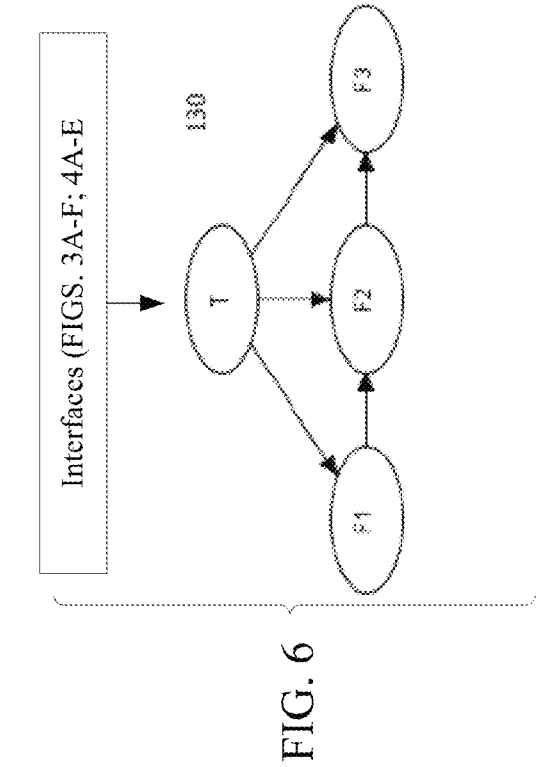
FIG. 6 is a diagram depicting a structure of a Tree-Augmented Naive Bayes Model (TAN).

Referring now to FIG. 5, the structure 120 of a Naïve Bayes Model (NBM) is shown. Although the structure 120 of the model of FIG. 6 is a NBM it could be representative of other types of models with parent-child modes. Of the models discussed, the NBM is the simplest model type. The NBM captures pair-wise correlations between T and each predictor variable $F_i$. In a NBM the observations $F_i$ and $F_j$ are conditionally independent given T.

The posterior probability of taking on the value given a set of observations $$\epsilon=\{f_1,f_2,f_3\} \text{ on } F=\{F_1,\ldots,F_n\}$$

is computed as:

$$:P(t|\epsilon)=P(t)P(f_1|t)P(f_2|t)P(f_2|t)$$

Tree-Augmented Naive Bayes Model (TAN)

Referring now to FIG. 6, the structure 130 of a Tree-Augmented Naive Bayes Model (TAN) is shown. Although the structure 130 of the model of FIG. 6 is a TAN it could be representative of other types of models with complex conditional structure. The TAN is more complex than the NBM, discussed above. The Tree-Augmented Naive Bayes Model (TAN) captures pair-wise correlations between predictors as well as the pair-wise correlations between T and each predictor variable $F_i$. In a TAN the graph induced by observations $F=\{F_1,\ldots,F_n\}$ is in the form of a tree structure.

In the example, the posterior probability of T taking on the value t given a set of observations $\epsilon=\{f_1,f_2,f_3\}$ on $F=\{F_1,F_2,F_3\}$ is computed as:

$$P(t|\epsilon)=P(t)P(f_3|f_2,t)P(f_2|f_1,t)P(f_1|t)$$

Hierarchical Naive Bayes Model (HNBM)

Figure 7:
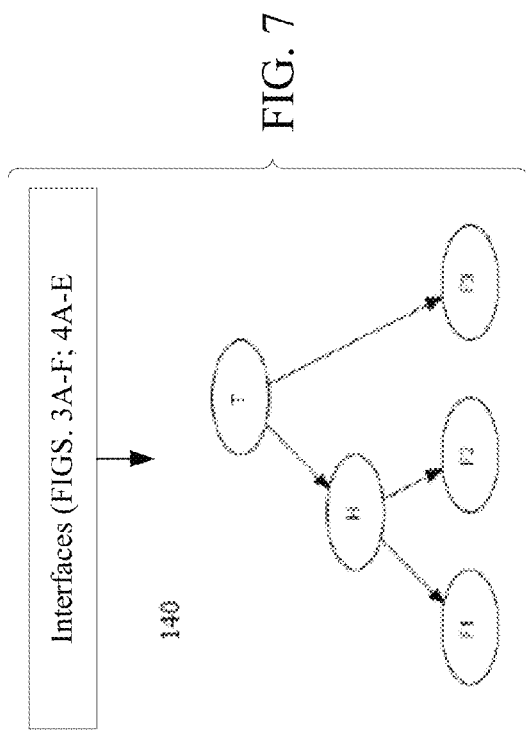
FIG. 7 is a diagram depicting a structure of a Hierarchical Naive Bayes Model (HNBM).

Referring now to FIG. 7, the structure 140 of a Hierarchical Naive Bayes Model (HNBM) is shown. Although the structure 140 of the model of FIG. 6 is a HNBM it could be representative of other types of models in which unknown and/or latent relationships are discovered by execution of the model. The HNBM is a more advanced model than the others considered so far. (Unlike NBM and TAN, which, in the example, are best for predictive accuracy, the HNBM model type is primarily used to discover the underlying relationships of word components.) The Hierarchical Naive Bayes Model (HNBM) captures correlations between predictors using hidden variables. A variable is "hidden" if the variable is never directly observed by analysis of the data. The structure of HNBM is a tree structure. The structure of HNBM is illustrated where H is a hidden variable.

The posterior probability of T taking on the value t given a set of observations $\epsilon=\{f_1,f_2,f_3\}$ on $F=\{F_1,F_2,F_3\}$ is computed as:

$$P(t|\varepsilon) = P(t)P(f_3|t)\sum_H P(f_1|H,t)P(f_2|H,t)$$

While the NBM assumes predictor variables to be conditionally independent given the target variable, the TAN and HBM relax this assumption.

Hierarchical models are the organization of variables into trees that stratify variables according to statistical correlations, conditional on the parent variable. As the 'parent variable' in this case is the target variable, the hidden variable is previously an unknown and introduced in order to capture conditional correlations between words given the target, to provide stratification of the variables.

Hidden variables in the HNBM are identified based on statistical correlation between each pair of predictor variables conditional on the value of T.

A hidden variable H is introduced as the parent of two nodes (feature variables, hidden variables, or a mix thereof) when the statistical correlation between to descendent feature variables conditional on the value of T is above a predefined significance level Let H be a hidden variable introduced as the parent of $F_i, F_j$. The state space of H is determined by repeatedly running the EM algorithm with H having one state, two states, etc. with $\|F_i\|*\|F_j\|$ as an upper limit on the state space size of H where $\|Y\|$ denotes the state space size of Y.

The state space size of H is determined as the state space size producing the highest BIC score. We can use a BIC score in order to penalize model complexity.

Example Generic Algorithm (Poses/Moses) Representation or(and(or(and($MODERATE_t1.3 !$PRESCRIBE_t0.02) $CONCERN_t0.8 $EVIDENCE_t0.4 $INCREASING_t0.3 $RESTRICTED_t0.1) or($ALBUTEROL_t1.2 $AMOUNTS_t0.08 $SYSTEM_t0.08 $VIEW_t0.8) or(!$STOMACH_t0.4 !$SURROGATE_t0.7)) and(!$BRING_t0.6 !$HIGH_t1.9 !$MINUTES_t2.5 !$SAT_t0.7 $STOMACH_t0.4) $LOWEST_t0.08 $NYSTAGMUS_t0.03 $OLANZAPINE_t0.05 $OVERDOSE_t0.09 $PRESCRIBE_t0.02 $SUPERFICIAL_t0.16 $WEAPONS_t0.04 $WITHDRAWAL_t0.2)

The above is an illustrative example of a genetic algorithm representation built from a canned dataset and is here to explain the representation. The representation may be understood as follows: $MODERATE_t1.3 takes on a value of 'true' if the word 'moderate' occurs 1.3 or more times in the text (floating point values used in case word-counts have been normalized to non-integer values). The exclamation mark! indicates that the condition does not hold: so !$PRESCRIBE_t0.02 means that the word 'prescribe' does NOT occur 0.02 or more times. The Boolean operators 'and', 'or' serve to conjoin these conditions: thus the above is saying that, "if the word 'moderate' appears at least twice, and the word 'prescribe' does not appear, or if any of the words 'concern', 'evidence', 'increasing' or 'restricted' appear at least once, and the word 'albuterol' appears at least twice . . . then the patient should be classified as belonging to group 2."

The invention can be implemented in digital electronic circuitry, or in computer hardware, firmware, software, or in combinations thereof. Apparatus of the invention can be implemented in a computer program product tangibly embodied in a computer and/or a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Figure 8:
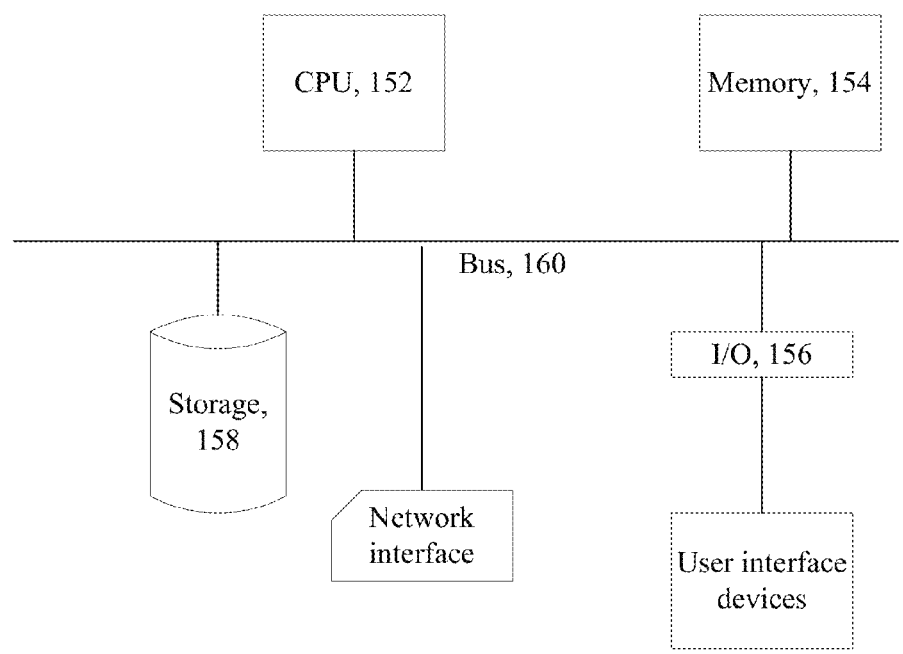
FIG. 8 is a diagram depicting an exemplary computer system.

An example of one such type of computer is shown in FIG. 8, which shows a block diagram of a programmable processing system (system) 150 suitable for implementing or performing the apparatus or methods of the invention. The system 150 includes a processor 152, a random access memory (RAM) 154, a program memory (for example, a writable read-only memory (ROM) such as a flash ROM not shown), a hard drive 156, and an input/output (I/O) controller 158 coupled by a processor (CPU) bus 160. The system 150 can be preprogrammed, in ROM, for example, or it can be programmed (and reprogrammed) by loading a program from another source (for example, from a floppy disk, a CD-ROM, or another computer).

A hard drive controller is coupled to the hard disk 156 suitable for storing executable computer programs, including programs embodying the present invention, and data including storage. The I/O controller 158 is coupled by an I/O bus (not numbered) to an I/O interface 327. The I/O interface 327 receives and transmits data in analog or digital form over communication links such as a serial link, local area network, wireless link, and parallel link.

Other environments could of course be used.

A number of embodiments of the invention have been described. Nevertheless, it will be understood that various modifications may be made without departing from the spirit and scope of the invention. Accordingly, other embodiments are within the scope of the following claims.

What is claimed is:

1. A method executed in a computer system for providing a user interface to a tool for estimating a probability that a future event will occur based on user input, the method comprises:
   generating by one or more computer systems a first set of interfaces that include rating, trend, cohort, record, and source controls, each of which when selected, provide corresponding data from one predictive model that produces predictions of the likelihood of an event occurring in the future based on analysis of data in a database, with one of the generated interfaces having a mode control to select between a first basic mode that presents in the interfaces an overall statistical rating, with supporting statistics, and analyst notes from one predictive model, and a second, enhanced mode that presents users with an interface to build models; and
   sending by one or more computer systems the first set of interface outputs to a user system.

2. The method of claim 1, wherein the mode control to select between the first basic mode and the second enhanced mode is presented in an initial interface.

3. The method of claim 1, wherein the generated interfaces include an initial search interface comprising a search bar that renders found published predictive models meeting search criteria.

4. The method of claim 1, further comprising:
   searching by one or more computers, based on user input in the first set of interfaces, models, according to model type or by model topic.

5. The method of claim 1, wherein the generated interfaces include a region to render search results corresponding to one or more found predictive models, with a determined prediction from the one or more found models.

6. The method of claim 1, wherein the generated interfaces include a region to render search results for predictive models, with for each result returned for a found model, controls are rendered in the generated interfaces, with the controls corresponding to the rating control, the trend control, the by cohort control, the record control, and the source control.

7. The method of claim 1, wherein the rating control launches the software to determine a prediction of risk on a given day or time.

8. The method of claim 1, wherein the trend control produces a chart of predictions for the security vs. the actual security values.

9. The method of claim 1, wherein the "by cohort" control provides a comparison.

10. The method of claim 1, wherein the "the record icon provides an area for analyst annotated notes on the model and the source icon provides content from a source.

11. The method of claim 1, wherein the first set of interfaces includes a results area which displays representations of found models, with each result having a dedicated set of the rating, trend, cohort record and source controls for a model corresponding to the result.

12. The method of claim 1, wherein the results area for a particular model further includes a signal strength value wherein tested accuracy of the model is displayed.

13. A method executed in a computer system for providing a user interface to a model for estimating a probability that a future event will occur based on user input, the method comprises:
   generating by one or more computer systems a first set of interfaces that include data source, model, test case and prediction tabs each of which when selected provide corresponding data from one predictive model that produces predictions of the likelihood of an event occurring in the future based on analysis of data in a database; with the models tab when selected, provides a control to create a model or controls to sort models by date, and filter models according to privileges; and
   sending by the by one or more computer systems the first set of interface outputs to a user system.

14. The method of claim 13 wherein one of the generated interfaces has a mode control to select between a first basic mode that presents in the interfaces an overall statistical rating, with supporting statistics, and analyst notes from one predictive model, and a second, enhanced mode that presents users with an interface to build models.

15. The method of claim 13 wherein when the data sources tab is selected an overlay window is provided to aid the user in selecting data sources from which to collect data that will be used in building the model.

16. The method of claim 13, wherein when the test cases tab is selected the interface presents the user an overlay window with fields to select a model name an option description and a sharing level, e.g., private or public and a control to apply a test case to test the selected model.

17. The method of claim 13, wherein when the predictions tab is selected predictions are rendered from execution of the model and a sort control sorts predictions according to date and by model performance.

18. A system for providing a user interface to a tool for estimating a probability that a future event will occur based on user input comprises:
   a processor;
   memory operatively connected to the processor; and a computer storage device storing a computer program product for generating by the processor a first set of interfaces, the computer program product comprising instructions for causing the processor to generate the first set of interfaces, with the first set of interfaces including rating, trend, cohort, record, and source controls each of which when selected provide corresponding data from one predictive model that produces predictions of the likelihood of an event occurring in the future based on analysis of data in a database, with one of the first set of interfaces having a mode control to select between a first basic mode that presents in the interfaces an overall statistical rating, with supporting statistics, and analyst notes from one predictive model, and a second, enhanced mode that presents users with an interface to build models; and send the first set of interfaces to a user system.

19. The system of claim 18, wherein the first set of interfaces includes a results area which displays plural results of found models, with each result having a dedicated set of the rating, trend, cohort record and source controls for a model corresponding to the result.

20. A computer program product tangibly stored on a computer readable hardware storage device the computer program product for providing a user interface to a tool for estimating a probability that a future event will occur based on user input, the computer program product comprises instructions to:

generate the first set of interfaces, with the first set of interfaces including rating, trend, cohort, record, and source controls each of which when selected provide corresponding data from one predictive model that produces predictions of the likelihood of an event occurring in the future based on analysis of data in a database, with one of the first set of interfaces having a mode control to select between a first basic mode that presents in the interfaces an overall statistical rating, with supporting statistics, and analyst notes from one predictive model, and a second, enhanced mode that presents users with an interface to build models; and send the first set of interface outputs to a user system.

21. The computer program product of claim 20, wherein the first set of interfaces includes a results area which displays plural results of found models, with each result having a dedicated set of the rating, trend, cohort record and source controls for a model corresponding to the result.

* * * * *